US 11,378,796 B2

(12) United States Patent
Du et al.

(10) Patent No.: US 11,378,796 B2
(45) Date of Patent: Jul. 5, 2022

(54) LIGHT VALVE DEVICE AND SMART GLASS

(71) Applicant: BOE TECHNOLOGY GROUP CO., LTD., Beijing (CN)

(72) Inventors: Zhihong Du, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 309 days.

(21) Appl. No.: 16/753,966

(22) PCT Filed: Oct. 8, 2019

(86) PCT No.: PCT/CN2019/109931
§ 371 (c)(1),
(2) Date: Apr. 6, 2020

(87) PCT Pub. No.: WO2020/073885
PCT Pub. Date: Apr. 16, 2020

(65) Prior Publication Data
US 2021/0011278 A1  Jan. 14, 2021

(30) Foreign Application Priority Data
Oct. 9, 2018 (CN) .......................... 201811171952.4

(51) Int. Cl.
*H01H 47/00* (2006.01)
*G02B 26/02* (2006.01)
(Continued)

(52) U.S. Cl.
CPC ............. *G02B 26/02* (2013.01); *H01F 7/064* (2013.01); *H01F 7/20* (2013.01)

(58) Field of Classification Search
None
See application file for complete search history.

(56) References Cited

U.S. PATENT DOCUMENTS 4,266,339 A * 5/1981 Kalt .......................... E06B 9/24
29/829
6,639,572 B1  10/2003 Little et al.
(Continued)

FOREIGN PATENT DOCUMENTS

CN          205936226 U     2/2017
CN          108267900 A     7/2018
(Continued)

OTHER PUBLICATIONS

International Search Report of PCT/CN2019/109931 and English translation, dated Dec. 30, 2019, 17 pages.

*Primary Examiner* — Stephen W Jackson
(74) *Attorney, Agent, or Firm* — Muncy, Geissler, Olds & Lowe, P.C.

(57) ABSTRACT

The disclosure relates to a light valve device and smart glass. The light valve device includes a transparent substrate, a rollable light shielding film, and a limit fixing structure. The light shielding film includes an upper surface, a lower surface, and a plurality of end surfaces between the upper surface and the lower surface, the end surface including at least a first end surface and a second end surface that are opposite to each other, an edge portion of the light shielding film proximate to the first end surface being fixed on the transparent substrate, and the light shielding film being capable of being rolled to move the second end surface toward the first end surface. The limit fixing structure includes a first fixing member arranged on a portion of the light shielding film proximate to the second end surface; and a second fixing member arranged on the transparent substrate and configured to cooperate with the first fixing member to fix the light shielding film after the light shielding film is unrolled.

20 Claims, 2 Drawing Sheets

(51) Int. Cl.
*H01F 7/06* (2006.01)
*H01F 7/20* (2006.01)

(56) References Cited

U.S. PATENT DOCUMENTS

| | | | |
|---|---|---|---|
| 9,182,592 B2* | 11/2015 | Ueno | G01N 21/9501 |
| 2002/0148964 A1 | 10/2002 | Dausch et al. | |
| 2004/0001033 A1* | 1/2004 | Goodwin-Johansson | G09G 3/3433 |
| | | | 345/31 |
| 2008/0259226 A1* | 10/2008 | Broer | G02B 26/02 |
| | | | 349/1 |
| 2019/0244975 A1 | 8/2019 | He et al. | |

FOREIGN PATENT DOCUMENTS

| | | |
|---|---|---|
| CN | 207693418 U | 8/2018 |
| CN | 109188678 A | 1/2019 |

* cited by examiner

LIGHT VALVE DEVICE AND SMART GLASS

CROSS-REFERENCE TO RELATED APPLICATION

This application is the U.S. national phase of PCT Application No. PCT/CN2019/109931 filed on Oct. 8, 2019, which claims a priority to Chinese Patent Application No. 201811171952.4 filed on Oct. 9, 2018, the disclosures of which are incorporated in their entirety by reference herein.

TECHNICAL FIELD

The present disclosure relates to the field of display technology, in particular, to a light valve device and smart glass including the light valve device.

BACKGROUND

Current smart glass uses polymer-based light valve units. When the light shielding device using the light valve unit needs to be in a light transmitting state, the voltage provided to the light valve unit is zero, and the light shielding film is in a rolled state. When the light shielding device using the light valve unit is in a light shielding state, the voltage applied to the light valve unit is not zero, and the light shielding film is in an unrolled state. In order to maintain the light shielding state of the device to be shielded, it is necessary to maintain the light shielding film in an unrolled state, and thus it is necessary to continuously maintain the voltage applied on the light valve unit. Therefore, smart glass using a polymer-based light valve unit consumes relatively high power.

SUMMARY

In one aspect, the present disclosure provides a light valve device, including: a transparent substrate; a rollable light shielding film, the light shielding film comprising an upper surface, a lower surface, and a plurality of end surfaces between the upper surface and the lower surface, the end surface including at least a first end surface and a second end surface that are opposite to each other, an edge portion of the light shielding film proximate to the first end surface being fixed on the transparent substrate, and the light shielding film being capable of being rolled to move the second end surface toward the first end surface; and a limit fixing structure, including a first fixing member arranged on a portion of the light shielding film proximate to the second end surface; and a second fixing member arranged on the transparent substrate and configured to cooperate with the first fixing member to fix the light shielding film after the light shielding film is unrolled.

Optionally, the first fixing member and the second fixing member are clamping members, the first fixing member includes at least one clamping slot recessed from an end surface adjacent to the second end surface, and the second fixing member includes a clamping block arranged on the transparent substrate.

Optionally, the clamping block includes a parallel portion extending along a direction parallel to a surface of the transparent substrate and a vertical portion extending along a direction perpendicular to the surface of the transparent substrate, one end of the vertical portion being connected to the parallel portion and the other end of the vertical portion being fixedly connected to the transparent substrate; and a length of the clamping slot in the first direction is greater than a length of the vertical portion in the first direction and less than a length of the parallel portion in the first direction, so that the vertical portion is received in the clamping slot and the light shielding film is fixed by the clamping block, and the first direction is a direction from the first end surface to the second end of the light shielding film.

Optionally, the light shielding film includes two opposite end surfaces adjacent to the second end surface, and each of the two opposite end surfaces is provided with at least one clamping slot in a manner of being recessed from the two end surfaces.

Optionally, the clamping slots respectively arranged on the two opposite end surfaces are identical in number, and the clamping slots arranged on one of the two opposite end surfaces correspond to the clamping slots arranged on the other of the two opposite end surfaces respectively.

Optionally, a center line of each clamping slot arranged on the two opposite end surfaces and a center line of a clamping slot arranged on the other end surface and corresponding to the clamping slot are on a same straight line, the center line refers to a straight line passing through a center point of a slot bottom and a center point of a slot opening.

Optionally, the clamp block is movably arranged on the transparent substrate.

Optionally, the light valve device further includes a control structure for controlling a movement of the clamping block to control the clamping block to be connected or separated from the clamping slot.

Optionally, the clamping block is a magnetic member, and the control structure includes: a guide rail arranged on the transparent substrate, an orthogonal projection of the clamping slot on the transparent substrate falling into the guide rail, and the clamping block being movably arranged on the guide rail; an electromagnet arranged on an end of the guide rail away from the light shielding film; and a control unit configured to control a current direction of the electromagnet to provide an attractive force or a repulsive force to the magnetic member.

Optionally, the guide rail is an embedded guide rail formed on a side of the transparent substrate for supporting the light shielding film.

Optionally, a position sensor configured to sense a position of the light shielding film is arranged on the transparent substrate, the control unit being configured to control the current direction of the electromagnet according to a signal transmitted by the sensor to provide a magnetic force to the magnetic member and clamp the magnetic member in a corresponding clamping slot.

Optionally, the position sensor is arranged at an edge of the transparent substrate.

Optionally, the first end surface of the light shielding film is fixed to a first edge region of the transparent substrate, and the position sensor is arranged on a second edge region of the transparent substrate opposite to the first edge region.

Optionally, the first electrode is arranged on the transparent substrate; a second electrode is arranged on the light shielding film; and the light valve device further includes a control structure, configured to apply voltages of different polarities to the first electrode and the second electrode, respectively, so that the light shielding film is switched between a rolled state and an unrolled state.

In another aspect, the present disclosure provides smart glass, including a glass body and a light valve device arranged on the glass body, the light valve device including: a rollable light shielding film, the light shielding film comprising an upper surface, a lower surface, and a plurality of end surfaces between the upper surface and the lower surface, the end surface including at least a first end surface and a second end surface that are opposite to each other, an edge portion of the light shielding film proximate to the first end surface being fixed on the glass body, and the second end surface of the light shielding film being capable of being rolled to move toward the first end surface; and a limit fixing structure, including a first fixing member arranged on a portion of the light shielding film proximate to the second end surface, and a second fixing member arranged on the glass body and configured to cooperate with the first fixing member to fix the light shielding film after the light shielding film is unrolled.

Optionally, the first fixing member and the second fixing member are clamping members, the first fixing member includes at least one clamping slot recessed from an end surface adjacent to the second end surface, and the second fixing member includes a clamping block arranged on the transparent substrate.

Optionally, the clamping block includes a parallel portion extending along a direction parallel to a surface of the transparent substrate and a vertical portion extending along a direction perpendicular to the surface of the transparent substrate, one end of the vertical portion being connected to the parallel portion and the other end of the vertical portion being fixedly connected to the transparent substrate; and a length of the clamping slot in the first direction is greater than a length of the vertical portion in the first direction and less than a length of the parallel portion in the first direction, so that the vertical portion is received in the clamping slot and the light shielding film is fixed by the clamping block, and the first direction is a direction from the first end surface to the second end of the light shielding film.

Optionally, the light shielding film includes two opposite end surfaces adjacent to the second end surface, and each of the two opposite end surfaces is provided with at least one clamping slot in a manner of being recessed from the two end surfaces.

Optionally, the clamping slots respectively arranged on the two opposite end surfaces are identical in number, and the clamping slots arranged on one of the two opposite end surfaces correspond to the clamping slots arranged on the other of the two opposite end surfaces respectively.

Optionally, a center line of each clamping slot arranged on the two opposite end surfaces and a center line of a clamping slot arranged on the other end surface and corresponding to the clamping slot are on a same straight line, and the center line refers to a straight line passing through a center point of a slot bottom and a center point of a slot opening.

DETAILED DESCRIPTION

In order to illustrate the purposes, technical solution and advantages in the embodiments of the present disclosure in a clearer manner, the technical solutions in the embodiments of the present disclosure will be described hereinafter in conjunction with the drawings in the embodiments of the present disclosure in a clear and complete manner. Obviously, the following embodiments relate to a part of, rather than all of, the embodiments of the present disclosure. Based on the described embodiments of the present disclosure, a person skilled in the art may obtain the other embodiments, which also fall within the scope of the present disclosure.

Figure 1:
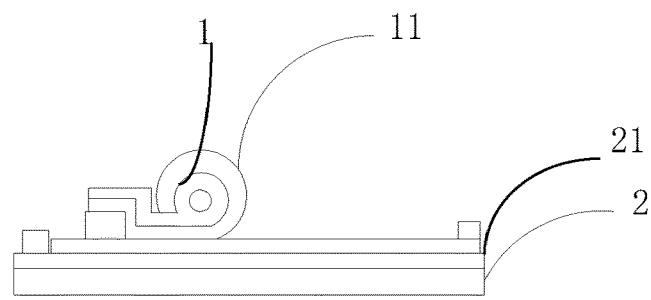
FIG. 1 is a schematic view showing a light valve device in the related art.

As shown in FIG. 1, the light valve unit related to the field of smart glass application includes a transparent substrate 2 and a rollable light shielding film 1 arranged on the transparent substrate 2. When the light valve unit is not powered, the light shielding film 1 is in a rolled state. When the light valve unit is powered, the charge on the light shielding film 1 and the charge on the transparent substrate 2 have different polarities, that is, the second electrode 11 on the light shielding film 1 and the first electrode 21 on the transparent substrate 2 have different potentials, so that the light shielding film 1 is unrolled. At this time, external light is blocked or absorbed by the light shielding film, so that the light shielding device is shielded. Therefore, in the related art, in order to maintain the light shielding state of the device to be shielded, it is necessary to maintain the light shielding film 1 in an unrolled state, and it is necessary to continuously maintain the light valve unit in a powered state and consuming power.

In order to solve the above technical problems, the present disclosure provides a light valve device to solve the problem that the current light valve unit consumes large power when it is maintained the light shielding state.

In one aspect, the present disclosure provides a light valve device, including: a transparent substrate; a rollable light shielding film, the light shielding film comprising an upper surface, a lower surface, and a plurality of end surfaces between the upper surface and the lower surface, the end surface including at least a first end surface and a second end surface that are opposite to each other, an edge portion of the light shielding film proximate to the first end surface being fixed on the transparent substrate, and the light shielding film being capable of being rolled to move the second end surface toward the first end surface; and a limit fixing structure, including a first fixing member arranged on a portion of the light shielding film proximate to the second end surface; and a second fixing member arranged on the transparent substrate and configured to cooperate with the first fixing member to fix the light shielding film after the light shielding film is unrolled.

In an embodiment according to the present disclosure, the rollable light shielding film is rolled and retracted by its own stress when being released by the limit fixing structure; and has different charges by applying a voltage to the light shielding film and the transparent substrate, so that the light shielding film is unrolled.

The light valve device according to the present disclosure can produce the following beneficial technical effects: after the light shielding film of the light shielding device is unrolled, the arrangement of the first fixing member and the second fixing member maintains the light shielding film in an unfolded state to shielding light without maintaining the applied voltage, thereby saving electrical energy.

Figure 2:
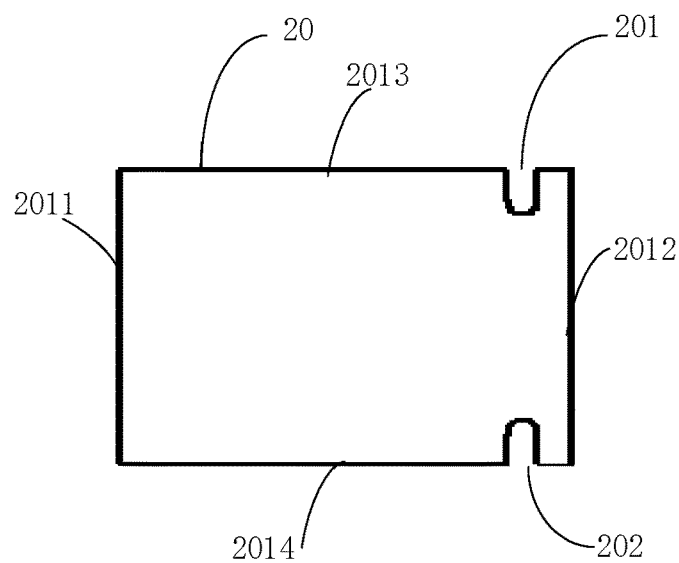
FIG. 2 is a schematic view showing a light shielding film according to an embodiment of the present disclosure.
Figure 3:
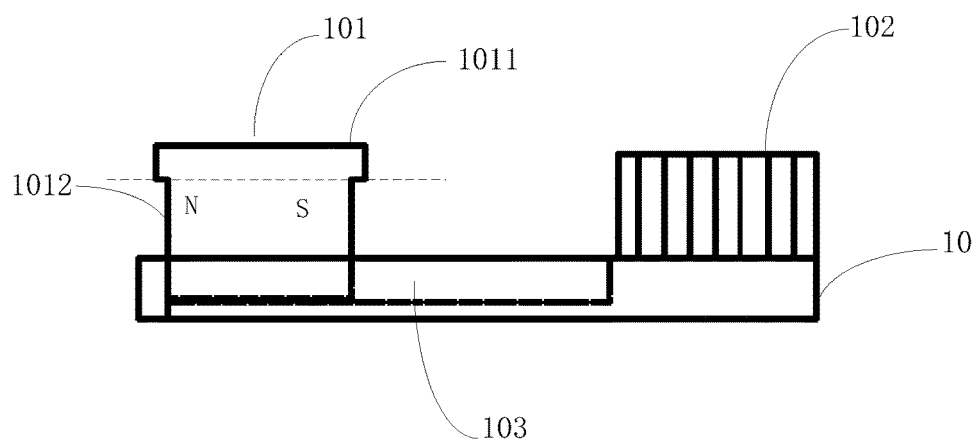
FIG. 3 is a schematic cross-sectional view showing a transparent substrate structure according to an embodiment of the present disclosure.
Figure 4:
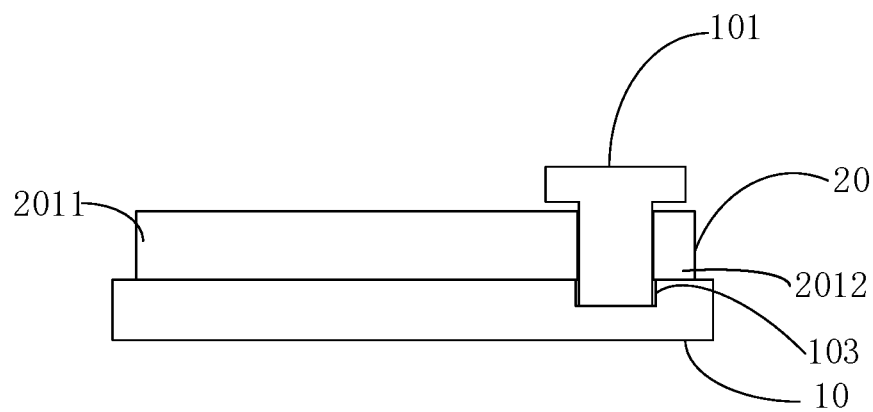
FIG. 4 is a schematic cross-sectional view showing a connection state between a clamping block and a clamping slot according to an embodiment of the present disclosure.

Specifically, as shown in FIGS. 2 to 4, an embodiment of the present disclosure provides a light valve device for realizing the switching between light transmission state and light shielding state of a device to be shielded. As shown in FIG. 4, the light valve device includes: a transparent substrate 10; a rollable light shielding film 20, the light shielding film including an upper surface, a lower surface, and a plurality of end surfaces between the upper surface and the lower surface, the end surface including at least a first end surface 2011 and a second end surface 2012 that are opposite to each other, an edge portion of the light shielding film 20 proximate to the first end surface 2011 being fixed on the transparent substrate 10, and the second end surface 2012 of the light shielding film 20 being capable of being rolled to move toward the first end surface; and a limit fixing structure capable of maintaining the light shielding film 20 in an unrolled state, the limit fixing structure including: a first fixing member 101 arranged on a portion of the light shielding film 20 proximate to the second end surface 2012; and a second fixing member arranged on the transparent substrate 10 and configured to cooperate with the first fixing member to fix the light shielding film 20 after the light shielding film 20 is unrolled.

In the embodiment of the present disclosure, after the light shielding film 20 is unrolled, the cooperation between the first fixing member and the second fixing member may maintain the light shielding film 20 in an unrolled state, and thus it is not necessary to conduct powering to maintain a voltage, thereby saving electrical energy.

It should be noted that, there may be various structures and implementation manners for switching the light shielding film 20 from a rolled state to an unrolled state. The implementation manners can be automatic or manual. For example, the light shielding film 20 can be switched from a rolled state to an unrolled state by applying voltages of different polarities to the transparent substrate 10 and the light shielding film 20. The switching from the rolled state to the unrolled state can also be achieved by other manners, for example, magnetic attraction and the like.

In an optional embodiment of the present disclosure, the transparent substrate 10 includes a supporting surface for supporting the light shielding film 20, and a first electrode is arranged on the supporting surface; the light shielding film 20 includes a contact surface capable of making contact with the transparent substrate 10, a second electrode is arranged on the contact surface, and an insulating layer, for example a layer of silicon dioxide or an organic resin material, is arranged between the first electrode and the second electrode; and the light valve structure further includes a control structure, configured to apply voltages of different polarities to the first electrode and the second electrode, respectively, so that the light shielding film is switched from a rolled state to an unrolled state.

There may be various specific setting positions of the control structure. The control structure and the transparent substrate 10 may be provided integrally with the transparent substrate 10. In practical applications, a specific position of the control structure may be set according to an actual use environment.

There may be various specific structures and specific connection manners of the first fixing member and the second fixing member. In an optional embodiment of the present disclosure, the first fixing member and the second fixing member are connected by a manner of clamping connection. Optionally, the first fixing member and the second fixing member are clamping members, the first fixing member includes at least one clamping slot recessed from an end surface adjacent to the second end surface, and the second fixing member includes a clamping block arranged on the transparent substrate. The manner of clamping connection makes the first fixing member and the second fixing member easy to be connected and separated, and thus easy to be operated.

In an optional embodiment of the present disclosure, the first fixing member includes at least one clamping slot arranged on the light shielding film 20 proximate to the second end surface, and the second fixing member includes a clamping block 101 arranged on the transparent substrate 10.

There are various manners of forming the clamping slot. For example, the clamping slot is formed by a cutting process at a corresponding position of the light shielding film 20. There may be various specific structural forms of the clamping block 101 and the corresponding clamping slot. The clamping block 101 shown in FIG. 3 and the clamping slots 201 and 202 shown in FIG. 2 are structural forms of the clamping block 101 and the clamping slots 201 and 202 according to an optional embodiment of the present disclosure. The block 101 includes a parallel portion 1011 extending along a direction parallel to the surface of the transparent substrate 10 and a vertical portion 1012 extending along a direction perpendicular to the surface of the transparent substrate 10. One end of the vertical portion 1012 is connected to the parallel portion 1011, and the other end thereof is fixedly connected to the transparent substrate. The length of the clamping slot in the first direction is greater than a length of the vertical portion 1012 in the first direction and less than a length of the parallel portion 1011 in the first direction, so that the vertical portion is received in the clamping slot and the light shielding film is fixed by the clamping block, and the first direction being a direction from the first end surface to the second end of the light shielding film. By the controlling of the control structure, the light shielding film 20 is unrolled, and the clamping block 101 is moved, so that the vertical portion 1012 is received in the clamping slot. The parallel portion 1011 plays a locking role, so that the light shielding film 20 is maintained in an unrolled state. Optionally, the shape of the clamping block along a cross section perpendicular to the surface of the transparent substrate is T-shaped or I-shaped.

In an optional embodiment of the present disclosure, the light shielding film 20 includes two opposite end surfaces adjacent to the second end surface, and each of the two opposite end surfaces is provided with at least one clamping slot in a manner of being recessed from the two end surfaces. As shown in FIG. 2, in addition to the opposite first end surfaces 2011 and 2012, the light shielding film 20 further includes two opposite end surfaces 2013 and 2012. The specific number of the clamping slots can be set according to actual needs.

Optionally, the upper surface of the light shielding film 20 according the embodiment of the present disclosure is rectangular. The light shielding film 20 includes a first end surface and a second end surface that are opposite to each other, and two end surfaces adjacent to and opposite to the second end surface.

In the embodiment of the present disclosure, in order to ensure the stability after the first fixing member and the second fixing member are connected, and to effectively ensure that the light shielding film 20 can be maintained in the unrolled state, clamping slots arranged on two opposite end surfaces correspond to each other in one-to-one manner, respectively, that is, each clamping slot is arranged to correspond to a clamping slot arranged on the opposite end surfaces in one-to-one manner. Optionally, a center line of each clamping slot 201 arranged on the two opposite end surfaces and a center line of a clamping slot 202 arranged on the other end surface and corresponding to the clamping slot are on a same straight line. The center line of the clamping slot 201 is a straight line passing through the center point of the slot bottom of the clamping slot 201 and the center point of the slot opening of the clamping slot 201, and the center line of the clamping slot 202 is a straight line passing through the center point of the slot bottom of the clamping slot 202 and the center point of the slot opening of the clamping slot 202.

Specifically, as shown in FIG. 2, a clamping slot 201 is arranged on a certain end surface, and a clamping slot 202 is arranged on the other end surface opposite to the end surface, in which the center line of the clamping slot 201 and the center line of the clamping slot 202 are on the same straight line. The corresponding movement track of the clamping block 101 and the center line of the clamping slot 201 or the center line of the clamping slot 202 are on the same straight line.

FIG. 4 is a schematic view showing that the connection of the clamping block 101 and the corresponding clamping slot allows the light shielding film in an unrolled state. In order to clearly show the structure of each part in FIG. 4, there is a gap between the clamping block 101 and the clamping slot, and there is a gap between the clamping block and the guide rail. However, the size of these gaps can be specifically determined according to the needs in actual use, and can be zero or greater than zero, provided that the stability of the connection between the clamping block and the clamping slot needs to be ensured.

In an optional embodiment of the present disclosure, the clamping block 101 is movably arranged on the transparent substrate 10. When the light shielding film 20 is unrolled, the clamping block 101 is moved to cooperate with the corresponding clamping slot, so that the light shielding film 20 is maintained in the unrolled state, and further the device to be shielded is in a light shielding state. The clamping block 101 moves in the opposite direction to be separated from the corresponding clamping slot, and the light shielding film 20 can be switched from the unrolled state to the rolled state.

The movement of the clamping block 101 can be automatic or manual. For example, when a guide rail is arranged on the transparent substrate 10 and the clamping block 101 needs to be moved to be connected to the corresponding clamping slot, and it is only necessary to manually move the clamping block 101 along the guide rail into the corresponding clamping slot. In order to facilitate the movement of the clamping block 101, optionally, the clamping block 101 may be moved in an automatic manner. In an optional embodiment of the present disclosure, the light valve device further includes a control structure, controlling a movement of the clamping block 101 to control the clamping block 101 to be connected or separated from the clamping slot.

There may be various setting forms of the guide rails, and there may also be various specific structural forms of the guide rails. In order not to affect the use of the light shielding film, the guide rail according to this embodiment adopts an embedded guide rail. That is, the guide rail is formed by a trenching process in a supporting surface for supporting the light shielding film 20 on the transparent substrate 10. This ensures the entire flatness of the supporting surface for supporting the light shielding film 20 on the transparent substrate 10.

The setting position of the guide rail corresponds to the setting position of the clamping slot on the light shielding film 20. This ensures that, when the light shielding film 20 is in the unrolled state, the clamping block can be smoothly moved into the clamping slot along the guide rail to fix the light shielding film 20, so that the light shielding film 20 is maintained in the unrolled state.

In an optional embodiment of the present disclosure, the clamping block 101 is a magnetic member, and the control structure includes: a guide rail 103 arranged on the transparent substrate 10, when the light shielding film is unrolled, an orthogonal projection of the clamping slot on the transparent substrate 10 falling into the guide rail 103, and the clamping block 101 being movably arranged on the guide rail 103 (as shown in FIG. 4, the clamping block 101 can be moved along the guide rail 103 in a direction proximate to or away from the clamping slot, so as to be connected to or separated from the clamping slot); an electromagnet 102 arranged on an end of the guide rail 103 away from the light shielding film 20; and a control unit configured to control a current direction of the electromagnet 102 to provide an attractive force or a repulsive force to the magnetic member.

When the current direction of the electromagnet 102 controlled by the control unit is a first direction, such that the polarity of one end of the electromagnet 102 proximate to the magnetic member is same as the polarity of the magnetic member proximate to one end of the electromagnet 102, the electromagnet 102 generates a repulsive force to the magnetic part, so that the clamping block 101 moves along a direction proximate to the corresponding clamping slot and is connected to the corresponding clamping slot. When the current direction of the electromagnet 102 controlled by the control unit is a second direction opposite to the first direction, such that the polarity of one end of the electromagnet 102 proximate to the magnetic member is opposite to the polarity of the magnetic member proximate to one end of the electromagnet 102, the electromagnet 102 generates an attractive force to the magnetic part, so that the clamping block 101 moves along a direction away from the corresponding clamping slot and is separated from the corresponding clamping slot.

FIG. 3 is an implementation of the control unit of the present disclosure. One end of the clamping block 101 away from the electromagnet 102 is N pole, and one end proximate to the electromagnet 102 is S pole. By the controlling of the control structure, when the polarity of one end of the electromagnet 102 proximate to the clamping block 101 is S pole that is same as the polarity of one end of the clamping block 101 proximate to the electromagnet 102, the acting force generated by the electromagnet 102 to the clamping block 101 is a repulsive force, so that the clamping block 101 moves along a direction proximate to the corresponding clamping slot and is connected to the corresponding clamping slot. By the controlling of the control structure, when the polarity of one end of the electromagnet 102 proximate to the clamping block 101 is N pole that is opposite to the polarity of one end of the clamping block 101 proximate to the electromagnet 102, the acting force generated by the electromagnet 102 to the clamping block 101 is an attractive force, so that the clamping block 101 moves along a direction away from the corresponding clamping slot and is separated from the corresponding clamping slot.

In an optional embodiment of the present disclosure, in order to ensure the flatness of the surface of the light shielding film 20 when the light shielding film 20 is in an unrolled state, the guide rail 103 is an embedded guide rail 103, as shown in FIG. 3.

Figure 5:
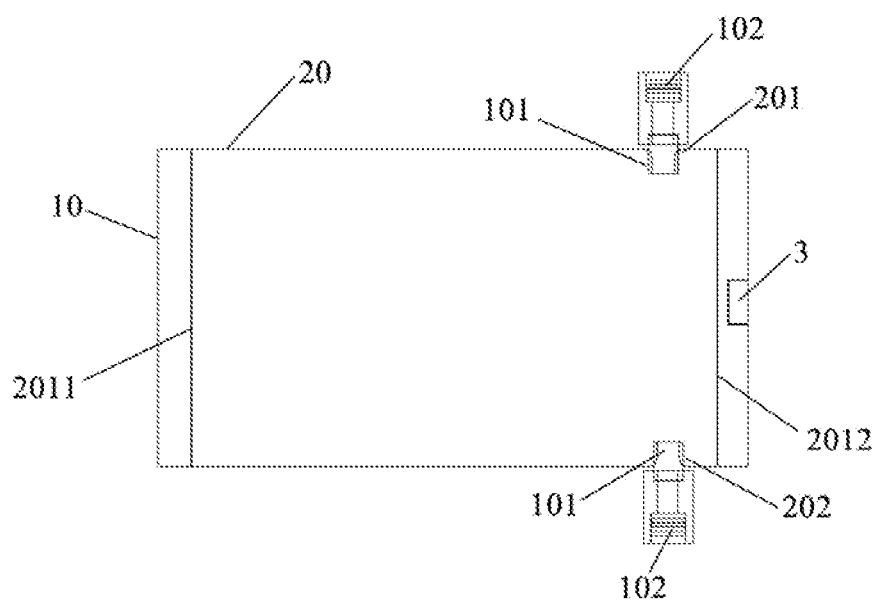
FIG. 5 shows a top view showing a light valve device according to an embodiment of the present disclosure.

In an optional embodiment of the present disclosure, in order to improve the accuracy of the movement of the clamping block 101, a sensor 3 configured to sense the position of the light shielding film 20 is arranged on the transparent substrate 10, as shown in FIG. 5. The control unit is configured to control the current direction of the electromagnet 102 according to a signal transmitted by the sensor 3 to provide a magnetic force to the magnetic member and clamp the magnetic member in a corresponding clamping slot.

Specifically, the sensor 3 may be a position sensor, and the position sensor is arranged on an edge of the transparent substrate 10, i.e., a region other than a region for setting the light shielding film 20 on the transparent substrate 10. Optionally, a first edge region of the transparent substrate 10 fixes a first end surface of the light shielding film 20, and the position sensor is arranged on a second edge region of the transparent substrate 10 opposite to the first edge region. When the position sensor senses the light shielding film 20, it sends a signal to the control unit, the control unit controls the current direction of the electromagnet 102 according to the signal sent by the position sensor to provide a magnetic force to the magnetic member and clamp the magnetic member in a corresponding clamping slot.

There may be various specific types of the sensor. For example, the sensor may also be a through-beam sensor. The through-beam sensor includes a signal transmitting sensor and a signal receiving sensor respectively arranged on the first side and the second side. A first edge region of the transparent substrate 10 fixes a first end of the light shielding film 20, and the signal-emitting sensor is arranged on a second edge region opposite to the first edge region on the transparent substrate 10. The light shielding film 20 is unrolled, and the light shielding film 20 is located between the signal transmitting sensor and the signal receiving sensor, so that the through-beam sensor senses the light shielding film 20 and sends a signal to the control unit.

In another aspect, the present disclosure provides smart glass, including a glass body and a light valve device arranged on the glass body, the light valve device including: a rollable light shielding film, the light shielding film comprising an upper surface, a lower surface, and a plurality of end surfaces between the upper surface and the lower surface, the end surface including at least a first end surface and a second end surface that are opposite to each other, an edge portion of the light shielding film proximate to the first end surface being fixed on the glass body, and the second end surface of the light shielding film being capable of being rolled to move toward the first end surface; and a limit fixing structure, including a first fixing member arranged on a portion of the light shielding film proximate to the second end surface, and a second fixing member arranged on the glass body and configured to cooperate with the first fixing member to fix the light shielding film after the light shielding film is unrolled.

Optionally, the smart glass according to the embodiment of the present disclosure includes the light valve device according to any one of the above items.

The above descriptions are the following embodiments of the present disclosure. It should be noted that a person skilled in the art would make several improvements and substitutions without departing from the principles of the present disclosure. These improvements and modifications should also be regarded as the protection scope of the present disclosure.

What is claimed is:

1. A light valve device, comprising:
    a transparent substrate;
    a rollable light shielding film, the light shielding film comprising an upper surface, a lower surface, and a plurality of end surfaces between the upper surface and the lower surface, the end surface comprising at least a first end surface and a second end surface that are opposite to each other, an edge portion of the light shielding film proximate to the first end surface being fixed on the transparent substrate, and the light shielding film being capable of being rolled to move the second end surface toward the first end surface; and
    a limit fixing structure, comprising:
    a first fixing member arranged on a portion of the light shielding film proximate to the second end surface; and
    a second fixing member arranged on the transparent substrate and configured to cooperate with the first fixing member to fix the light shielding film after the light shielding film is unrolled.

2. The light valve device of claim 1, wherein the first fixing member and the second fixing member are clamping members, the first fixing member comprises at least one clamping slot recessed from an end surface adjacent to the second end surface, and the second fixing member comprises a clamping block arranged on the transparent substrate.

3. The light valve device of claim 2, wherein the clamping block comprises a parallel portion extending along a direction parallel to a surface of the transparent substrate and a vertical portion extending along a direction perpendicular to the surface of the transparent substrate, one end of the vertical portion being connected to the parallel portion and the other end of the vertical portion being fixedly connected to the transparent substrate; and wherein a length of the clamping slot in the first direction is greater than a length of the vertical portion in the first direction and less than a length of the parallel portion in the first direction, so that the vertical portion is received in the clamping slot and the light shielding film is fixed by the clamping block, and the first direction is a direction from the first end surface to the second end of the light shielding film.

4. The light valve device of claim 2, wherein the light shielding film comprises two opposite end surfaces adjacent to the second end surface, and each of the two opposite end surfaces is provided with at least one clamping slot in a manner of being recessed from the two end surfaces.

5. The light valve device of claim 4, wherein the clamping slots respectively arranged on the two opposite end surfaces are identical in number, and the clamping slots arranged on one of the two opposite end surfaces correspond to the clamping slots arranged on the other of the two opposite end surfaces respectively.

6. The light valve device of claim 5, wherein a center line of each clamping slot arranged on the two opposite end surfaces and a center line of a clamping slot arranged on the other end surface and corresponding to the clamping slot are on a same straight line, and the center line refers to a straight line passing through a center point of a slot bottom and a center point of a slot opening.

7. The light valve device of claim 2, wherein the clamp block is movably arranged on the transparent substrate.

8. The light valve device of claim 7, wherein the light valve device further comprises a control structure for controlling a movement of the clamping block to control the clamping block to be connected or separated from the clamping slot.

9. The light valve device of claim 8, wherein the clamping block is a magnetic member, and the control structure comprises:
    a guide rail arranged on the transparent substrate, an orthogonal projection of the clamping slot on the transparent substrate falling into the guide rail, and the clamping block being movably arranged on the guide rail;

an electromagnet arranged on an end of the guide rail away from the light shielding film; and
a control unit configured to control a current direction of the electromagnet to provide an attractive force or a repulsive force to the magnetic member.

10. The light valve device of claim 9, wherein the guide rail is an embedded guide rail formed on a side of the transparent substrate for supporting the light shielding film.

11. The light valve device of claim 9, wherein a position sensor configured to sense a position of the light shielding film is arranged on the transparent substrate, and the control unit is configured to control the current direction of the electromagnet according to a signal transmitted by the sensor to provide a magnetic force to the magnetic member and clamp the magnetic member in a corresponding clamping slot.

12. The light valve device of claim 11, wherein the position sensor is arranged at an edge of the transparent substrate.

13. The light valve device of claim 11, wherein a first end surface of the light shielding film is fixed to a first edge region of the transparent substrate, and the position sensor is arranged on a second edge region of the transparent substrate opposite to the first edge region.

14. The light valve device of claim 1, wherein a first electrode is arranged on the transparent substrate; a second electrode is arranged on the light shielding film; and the light valve device further comprises a control structure, configured to apply voltages of different polarities to the first electrode and the second electrode, respectively, so that the light shielding film is switched between a rolled state and an unrolled state.

15. Smart glass, comprising a glass body and a light valve device arranged on the glass body, the light valve device comprising:
a rollable light shielding film, the light shielding film comprising an upper surface, a lower surface, and a plurality of end surfaces between the upper surface and the lower surface, the end surface comprising at least a first end surface and a second end surface that are opposite to each other, an edge portion of the light shielding film proximate to the first end surface being fixed on the glass body, and the second end surface of the light shielding film being capable of being rolled to move toward the first end surface; and
a limit fixing structure, comprising:
a first fixing member arranged on a portion of the light shielding film proximate to the second end surface, and a second fixing member arranged on the glass body and configured to cooperate with the first fixing member to fix the light shielding film after the light shielding film is unrolled.

16. The smart glass of claim 15, wherein the first fixing member and the second fixing member are clamping members, the first fixing member comprises at least one clamping slot recessed from an end surface adjacent to the second end surface, and the second fixing member comprises a clamping block arranged on the transparent substrate.

17. The smart glass of claim 15, wherein the clamping block comprises a parallel portion extending along a direction parallel to a surface of the transparent substrate and a vertical portion extending along a direction perpendicular to the surface of the transparent substrate, one end of the vertical portion being connected to the parallel portion and the other end of the vertical portion being fixedly connected to the transparent substrate; and wherein a length of the clamping slot in the first direction is greater than a length of the vertical portion in the first direction and less than a length of the parallel portion in the first direction, so that the vertical portion is received in the clamping slot and the light shielding film is fixed by the clamping block, and the first direction is a direction from the first end surface to the second end of the light shielding film.

18. The smart glass of claim 17, wherein the light shielding film comprises two opposite end surfaces adjacent to the second end surface, and each of the two opposite end surfaces is provided with at least one clamping slot in a manner of being recessed from the end surfaces.

19. The smart glass of claim 18, wherein the clamping slots respectively arranged on the two opposite end surfaces are identical in number, and the clamping slots arranged on one of the two opposite end surfaces correspond to the clamping slots arranged on the other of the two opposite end surfaces respectively.

20. The smart glass of claim 19, wherein a center line of each clamping slot arranged on the two opposite end surfaces and a center line of a clamping slot arranged on the other end surface and corresponding to the clamping slot are on a same straight line, and the center line refers to a straight line passing through a center point of a slot bottom and a center point of a slot opening.

\* \* \* \* \*